United States Patent Office 3,690,927
Patented Sept. 12, 1972

---

3,690,927
ACRYLOXY ESTERS OF ANHYDRIDES AND COATING COMPOSITIONS DERIVED THEREFROM
Gordon M. Parker, Harwick, and Raymond C. Heuser, Arnold, Pa., assignors to PPG Industries, Inc., Pittsburgh, Pa.
No Drawing. Filed July 17, 1969, Ser. No. 842,717
Int. Cl. B44d 1/50
U.S. Cl. 117—93.31               30 Claims

ABSTRACT OF THE DISCLOSURE

This invention relates to acryloxy (or methacryloxy)-alkyl (or alkyloxyalkyl) organic dicarboxylic esters prepared by reacting an organic anhydride with a hydroxyalkyl acrylate (or methacrylate) and then reacting this half-ester with a terminally-saturated glycidyl ether or ester. These compounds are useful in coating compositions and are particularly useful in coating compositions curable by radiation.

---

The fact that certain unsaturated monomers and polymers are susceptible to polymerization and crosslinking by various forms of radiation such as light, especially ultraviolet light, electron beams and nuclear radiation, has been known in the art for many years. Recently the use of various forms of radiation in the polymerization and crosslinking of coating compositions has become of increased commercial interest to the coatings industry. One of numerous methods advanced in the art is set forth in U.S. Pat. No. 3,247,012.

It has now been found that compounds corresponding to the formula:

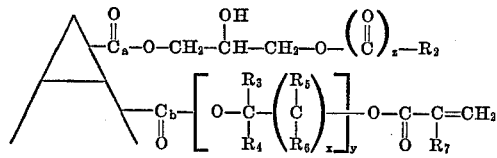

where A is the residual moiety of an organic dicarboxylic acid anhydride of the formula:

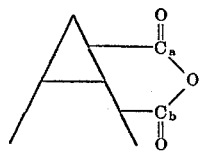

where

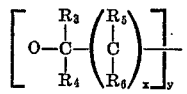

contains 2 to 10 carbon atoms, $x$ being a whole number from 1 through 9, $y$ being a whole number from 1 through 5 and where $R_3$, $R_4$, $R_5$, and $R_6$ are selected from the group consisting of hydrogen and lower alkyl; and where $R_7$ is selected from the group consisting of hydrogen and methyl, preferably hydrogen and where

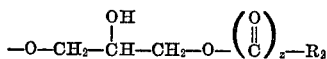

is the residual moiety of a glycidyl ether or a glycidyl ester having reacted with a carboxyl group of the organic half-ester, $z$ being 0 or 1, and $R_2$ being a terminally-saturated organic radical containing 1 to 30 carbon atoms and preferably 6 to 20 carbon atoms, more preferably hydrocarbon in nature and most preferably alkyl, alkenyl, phenyl, alkyl phenyl or cycloalkyl, produce excellent radiation curable coating compositions, especially in conjunction with other polyfunctional monomers, for example, those described in copending application Ser. No. 814,436, filed Apr. 8, 1969.

The above compounds are prepared by reacting, in a first stage, an organic acid anhydride with a hydroxyalkyl acrylate or methacrylate to form a half-ester. The resultant half-ester is then reacted with a terminally-saturated glycidyl ester or ether in a second stage to form the hydroxyl-containing unsaturated compounds of the formula above.

Virtually any monomeric unsubstituted anhydride may be employed in the reaction. Anhydrides bearing substituents which do not totally interfere with the anhydride ring opening or the subsequent reaction between the half-ester and glycidyl compounds may likewise be employed. Examples of such groups include halogen, for example, bromine, chlorine and fluorine and nitrile. Preferably, the anhydride employed is a vicinal anhydride.

Examples of such anhydrides includes anhydrides of the formulas:

(A) 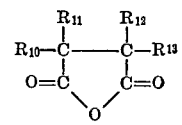

(B) 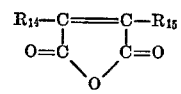

(C) 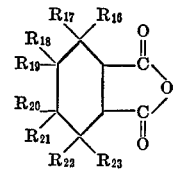

(D) 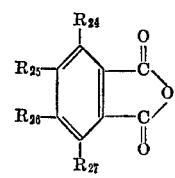

(E) 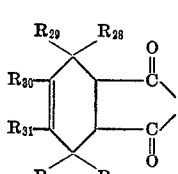

(F) 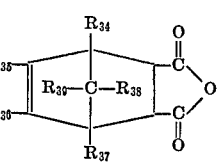

where $R_{16}$ through $R_{39}$ are independently selected from the group consisting of hydrogen, lower alkyl, chlorine, bromine and fluorine.

Specific anhydrides which may be employed include: succinic anhydride, methyl succinic anhydride, dodecenyl succinic anhydride, octenyl succinic anhydride, phthalic anhydride, tetrahydrophthalic anhydride, hexahydrophthalic anhydride, tetrachlorophthalic anhydride, tetrabromophthalic anhydride, hexachlorophthalic anhydride, hexabromophthalic anhydride, endomethylene tetrahydrophthalic anhydride, chlorendic anhydride, itaconic anhydride, citraconic anhydride, maleic anhydride, dichloromaleic anhydride, chloromaleic anhydride, ethyl maleic anhydride, dimethyl maleic anhydride, and others.

The hydroxyalkyl acrylate or methacrylate which may be employed in the first stage reactions includes any hydroxyalkyl acrylate of the formula:

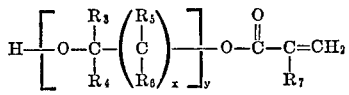

where $R_3$, $R_4$, $R_5$ and $R_6$ are selected from the group consisting of hydrogen and lower alkyl and $R_7$ is selected from the group consisting of hydrogen and methyl, preferably hydrogen, and where $x$ is a whole number from 1 through 9 and $y$ is a whole number from 1 through 5, the group

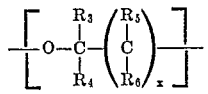

containing from 2 to 10 carbon atoms.

Specific examples of such compounds include hydroxyethyl acrylate, hydroxyethyl methacrylate, hydroxypropyl acrylate, hydroxypropyl methacrylate, hydroxyethoxyethyl acrylate, hydroxypropoxypropoxypropyl acrylate.

The glycidyl compound which may be used in the second stage is selected from the group consisting of terminally-saturated esters and ethers of acids or alcohols containing 1 to 30 carbon atoms and preferably 6 to 20 carbon atoms.

Specific examples of these compounds include methyl, ethyl, butyl, hexyl, octyl, decyl, undecyl, dodecyl, hexadecyl, octadecyl, behenic and cerotic glycidyl ethers or esters. Especially useful are the fatty acid glycidyl esters of both saturated and unsaturated fatty acids such as lauric, palmitic, stearic, myristic, caprylic, capric, butyric, caproic, oleic, linoleic, linolinic, eleostearic, licanic, ricinoleic palmitoleic, petroselenic, vaccenic and ernic acids among others. Likewise, the glycidyl ethers of the corresponding fatty alcohols are equally useful although, since the alcohols are conventionally produced by reduction of the fatty acid their cost is higher. Other glycidyl ethers and esters include benzyl glycidyl ester, phenyl glycidyl ether, cresyl glycidyl ether, the glycidyl ester of $C_8$ or $C_9$ coke acids (Cardura E ester), p-butylphenyl glycidyl ether, nonylphenyl glycidyl ether, 3-(pentadecyl)-phenyl glycidyl ether, $(C_{12-14}H_{22-26}O_3)$ glycidyl ester of a tert-carboxylic acid (molecular weight 240–250) and cyclohexyl glycidyl ether.

The compounds of this invention include 3-acetyloxy-2-hydroxypropyl 2-acryloxyethyl phthalate;
3-butyryloxy-2-hydroxypropyl 3-acryloxypropyl tetrahydrophthalate;
3-ethoxy-2-hydroxypropyl 2-methacryloxyethyl hexahydrophthalate;
3-butoxy-2-hydroxypropyl 3-methacryloxypropyl hexachlorophthalate;
3-hexanoyloxy-2-hydroxypropyl 2-(2-acryloxyethoxy)-ethyl chlorendate;
3-hexyloxy-2-hydroxypropyl 3-(3-acryloxypropoxypropoxy)propyl maleate;
3-benzoyloxy-2-hydroxypropyl 2-acryloxyethyl chloromaleate;
3-decanoyloxy(caprinoyloxy)-2-hydroxypropyl 3-acryloxypropyl citraconate;
3-cresoxy-2-hydroxypropyl 2-acryloxyethyl phthalate;
3-cyclohexyloxy-2-hydroxypropyl 3-acryloxypropyl tetrahydrophthalate;
3-undecanoxy-2-hydroxypropyl 2-acryloxyethyl phthalate;
3-ercosyloyloxy-2-hydroxypropyl 3-acryloxypropyl tetrahydrophthalate;
3-hexadecanoyloxy-2-hydroxypropyl 2-acryloxyethyl phthalate;
3-lauroxyloxy-2-hydroxypropyl 3-acryloxypropyl tetrahydrophthalate;
3-myristoyloxy-2-hydroxypropyl 2-acryloxyethyl phthalate;
3-hexadecyloxy-2-hydroxypropyl 3-acryloxypropyl tetrahydrophthalate;
3-nondecoyloxy-2-hydroxypropyl 2-acryloxyethyl phthalate;
3-octacosyloyloxy-2-hydroxypropyl 3-acryloxy propyl tetrahydrophthalate;
3-oleoyloxy-2-hydroxypropyl 2-acryloxyethyl phthalate;
3-stearoyloxy-2-hydroxypropyl 3-acryloxypropyl tetrahydrophthalate;
3-tetracosyloxy-2-hydroxypropyl 2-acryloxyethyl phthalate.

The first stage is conducted by charging the organic acid anhydride and hydroxyl acrylic compound into a reaction vessel and mixing to open the anhydride ring to form a half-ester.

The temperature at which the ring opening may be conducted can be varied widely, however, the reaction proceeds at room temperature, preferably, the reaction mixture is heated, usually to between about 70 and 120° C., although temperatures as high as 150° C. or higher may be employed, depending on the stability of the reactants or the acceptability of lower yield due to side reactions.

The proportion of the reactants is not critical; however, to obtain maximum conversion with maximum purity, a mole ratio approximating 1:1, for example, a mole ratio between about 0.7 and about 1.3, is desirable. The anhydride may be present in molar excess without substantial reaction. Molar excesses of the hydroxy compound may reduce the yield; however, molar excesses approaching 2:1 will still produce the desired product.

The reaction may be conducted in bulk, or, if desired, in the presence of an inert aromatic or polar organic material solvent such as, for example, dimethyl formamide, a polyethylene glycol dimethyl ether, ketones, toluene, xylene, and the like.

The first stage reaction is usually conducted in the absence of a catalyst; however, if desired, a catalyst for anhydride ring opening may be employed.

The second stage reaction is conducted by adding the glycidyl compound to the product of the first stage reaction. While it is possible to conduct the reaction by mixing the reactants, it is desirable to add the glycidyl compound incrementally so as to better control the reaction and to obtain higher yields of the desired product.

Again, in the second stage, the proportions of the reactants are not critical; however, to obtain maximum conversion with maximum purity, a mole ratio of approximately 1:1, for example, in the range of about 0.7 to about 1.3 moles, is desirable. The half-ester may be present in a molar excess without substantial reaction. Molar excess of the glycidyl compound may reduce the yield; however, excess of less than 2 moles will still produce the desired product.

While the reaction is usually conducted in bulk, it is possible to conduct the second stage reaction in the presence of an aromatic or inert polar material solvent such as described above.

The temperature at which the second-stage reaction is conducted is subject to wide variation. While the reaction proceeds at room temperature, it is desirable to heat the reaction mixture, usually to a temperature of about 70° C. to about 130° C. Temperatures as high as 150° C. or higher may be employed, depending on the stability of the reactants and products employed; however, these higher temperatures tend to increase side reactions and therefore reduce the yield of desired product.

While the use of a catalyst is not essential in the second stage reaction, it is desirable to employ an amine catalyst such as N-methyl morpholine.

Since the process has at least one reactant in each step containing polymerizable unsaturation, it is desirable, although not absolutely necessary, to employ an inhibitor in the reaction mixture, for example, a quinone, a hydroquinone, or a phenolic inhibitor of the type conventionally employed with unsaturated acrylic-type monomers. Examples of inhibitors include quinone, hydroquinone, methyl quinone and methyl hydroquinone and the dimethyl ether of hydroquinone.

The compounds hereinabove disclosed are curable to a thermoplastic state and at least some of the compounds thus cured especially by irradiation show adhesive properties and may be used alone or in combination with other adhesive ingredients to form adhesives. Further, the compounds of the invention are especially useful as modifiers or plasticizers or lower cost extenders for the coatings described in application Ser. No. 814,436, filed Apr. 8, 1969, which is hereby incorporated by reference. In this application they are usually employed in amounts ranging from 10 percent to about 60 percent, and preferably 15 percent to about 40 percent by weight of the total film-forming materials. Likewise, the compounds of the invention are useful as modifiers and plasticizers in conjunction with other polyfunctionally unsaturated polymerizable film-formers and especially those susceptible to radiation curing.

The particular method used to coat the substrate is not critical as any conventional coating technique may be used. For instance, spraying, roller coating, curtain coating, and many other well-known methods may be used. Using the monomers of the present invention, it is preferable to apply the coating using a roller coater to achieve thin uniform coatings.

The term "irradiation," as used herein, means high energy radiation and/or the secondary energies resulting from conversion of this electron or other particle energy to neutron or gamma radiation, said energies being at least equivalent to about 100,000 electron volts. While various types of irradiation are suitable for this purpose, such as X-ray and gamma and beta rays, the radiation produced by accelerated high energy electrons has been found to be very conveniently and economically applicable and to give very satisfactory results. However, regardless of the type of radiation and the type of equipment used for its generation or application, the use thereof in the practice of the invention as described herein is contemplated as falling within the scope of this invention so long as the ionization radiation is equivalent to at least about 100,000 electron volts.

While there is no upper limit to the electron energy that can be so applied advantageously, the effects desired in the practice of this invention can be accomplished without having to go to above about 20 million electron volts. Generally, the higher the electron energy used, the greater is the depth of penetration into the massive structure of the materials to be treated. For other types of radiation, such as gamma and X-rays, energy systems equivalent to the above range of electron volts are desirable.

It is intended that the term "irradiation" include what has been referred to in the prior art as "ionizing radiation" which has been defined as radiation possessing an energy at least sufficient to produce ions or to break chemical bonds and thus includes also radiations such as "ionizing particle radiation" as well as radiations of the type termed "ionizing electromagnetic radiation."

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van de Graaff generators, betatrons, synchrotrons, cyclotrons, etc. Neutron radiation can be produced by bombarding a selected light metal such as beryllium with positive particles of high energy. Particle radiation can also be obtained by the use of an atomic pile, radioactive isotopes, or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (mev.). In addition to irradiation of this type, commonly called X-ray, an ionizing electromagnetic irradiation suitable for the practice of this invention can be obtained by means of a nuclear reactor (pile) or by the use of neutral or synthetic radioactive material, for example, cobalt 60.

Various types of high power electron linear accelerators are commercially available, for example, the ARCO type traveling wave accelerator, Model Mark I, operating at 3 to 10 million electron volts, such as supplied by High Voltage Engineering Corporation, Burlington, Mass., or other types of accelerators as described in U.S. Pat. No. 2,763,609 and in British Pat. No. 762,953 are satisfactory for the practice of this invention.

The monomers described herein will cure acceptably using any total dosage between about 1 megarad and about 20 megarads. A "rad" is defined as that amount of radiation required to supply 100 ergs per gram of material being treated and a megarad is $10^6$ rads. The total dosage is the total amount of irradiation received by the coating or film. The rate of irradiation is generally not believed to be important as the total dosage is believed to be the predominant factor in the curing of the monomers.

The process of this invention is best carried out by applying a layer of from about one mil to about 25 mils thickness over a substrate and passing the coated substrate under electron beam irradiation at a certain line speed for a designated time. The particular speed and time is not critical so long as the coated substrate is exposed to the irradiation for a time long enough to acquire a total dose of about 1 to about 20 megarads. The line speed used may be varied according to apparatus limitations. However, it is desirable that the line speed be fast enough so that the monomer mixture will not flow off the substrate during curing. It is noted that at a total dosage of less than about 1 megarad there is generally insufficient polymerization of the monomers and that a total dosage exceeding about 20 megarads or often 10 megarads is unnecessary. The irradiation is preferably carried out in an inert atmosphere, such as nitrogen gas.

A typical coating composition has been found to comprise 57 percent of 2-acryloxyethyl-3-acryloxy-2-hydroxypropyl phthalate, 5 percent butyl acrylate and 38 percent Cardura E hydroxyethyl acrylate diester of phthalic anhydride.

In the above and similar formulations, Cardura E hydroxyethyl acrylate diester of phthalic anhydride may be replaced by any compound of the invention as set forth above to obtain a useful coating composition which may be radiation cured.

The compounds of the invention and formulations containing them are relatively dose rate independent within practical limits. Generally, a total dose of 3–4 megarads is sufficient to cure coatings containing the compounds of the invention. However, total doses as high as 20 megarads, or even many fold higher, do not appear to have a detrimental effect on the film. Obviously, however, economical consideration dictates the lowest total dose necessary to cure the films, which amount may readily be determined.

Preferably, for ease of application and curing, the above composition should be in liquid form and the ingredients and proportions should be chosen with this in mind.

For speed of cure and quality of the cured film, it is highly preferable that the curing of the above compositions be carried out in an inert atmosphere such as nitrogen, helium, argon, etc.

There are set forth below several examples which illustrate the methods of producing the compounds of the invention and their use in coating compositions. These examples are, of course, given by way of illustration only and should not be construed as limiting the invention to the particular details thereof. All parts and percentages set forth, as is true throughout the specification, are by weight unless otherwise specified.

EXAMPLE I

In a reactor were charged 50.9 parts of 2-acryloxy-ethyl hydrogen phthalate, 0.1 part hydroquinone and 0.1 part m-methyl morpholine. The mixture was heated to 110° C. and there was added over a period of 15 minutes 72.3 parts of glycidyl stearate, maintaining a temperature between 90 and 110° C. After the addition was complete, the reaction mixture was held between 115–120° C. for three hours. The final reaction mixture contained 2-acryloxethyl 3-stearoyloxy 2-hydroxypropyl phthalate.

EXAMPLE II

Into a reactor were charged 75 parts of 2-acryloxyethyl hydrogen phthalate, 0.15 part of hydroquinone and 0.15 part of triethylamine. This mixture was heated to 110° C. and there was added incrementally over a period of 20 minutes, 75.1 parts of a mixture of $C_8$ and $C_{10}$, normal alkyl monoglycidyl ethers. (Epoxide No. 7.) After addition was complete, the reaction mixture was held at 115° C. for nine hours. The product contained a mixture of 3-octyloxy and decyloxy 2-hydroxypropyl 2-acryloxyethyl phthalate.

EXAMPLE III

Into a reactor was charged 185 parts of 2-acyloxyethyl hydrogen phthalate, 0.4 part of hydroquinone and 0.4 part of triethylamine. This mixture was heated to 115° C. and there was then added incrementally 207.5 parts of a $C_{15}$ monoglycidyl ether. (Epoxide No. 8.) The addition was made over a one-hour period. The reaction mixture was then maintained at 115° C. for 17 hours. The final reaction mixture contained 3-pentadecyloxy-2-hydroxypropyl 2-acryloxyethyl phthalate.

EXAMPLE IV

Into a reactor were charged 245 parts Cardura E (a $C_{8-10}$ coke acid glycidyl ester); 264 parts of 2-acryloxyethyl hydrogen phthalate, 0.5 part of hydroquinone and 0.5 part of n-methyl morpholine. The reaction mixture was heated at 115–120° C. for three hours. The final mixture had an acid value of 1.8 and contained no measurable epoxy groups. The reaction mixture contained the corresponding phthalic diester.

EXAMPLE V

The following composition was cured under an electron beam in a nitrogen atmosphere at 400 kv. with a total dose of 2.3 megarads. The coating was cured and was solvent resistant and had good mar-resistance.

Parts by weight
3-acryloxy-2-hydroxypropyl 2-acryloxyethyl phthalate _____ 47.5
Butyl acrylate _____ 5.0
Compound of Example IV _____ 47.5

The same composition was drawn down on a panel and heated for five minutes at 300° F., then electron cured under the same conditions. This panel had a direct and a reverse impact resistance of 50 foot pounds.

EXAMPLE VI

The following compositions were electron cured at 400 kv. under nitrogen with a total dose of 2.6 megarads. All of the following samples were diluted with 10 percent butyl acrylate.

| 2-acryloxyethyl 3-acryloxy-2-hydroxypropyl phthalate, parts | Epoxide No. 8 ester prepared in accordance with Example III, parts | Remarks |
| --- | --- | --- |
| 95 | 5 | Hard, mar-resistant film. |
| 90 | 10 | Do. |
| 80 | 20 | Do. |
| 70 | 30 | Do. |
| 60 | 40 | Do. |
| 50 | 50 | Soft, readily marable film. |
| 0 | 100 | Tacky, adherent film. |

Similar results are obtained by substituting the corresponding starting materials to produce the other compounds enumerated. Likewise, the compounds shown in the working examples may be replaced by other compounds within the scope of the invention to achieve equivalent results.

According to the provisions of the patent statutes, there are described above the invention and what are now considered to be its best embodiments. However, within the scope of the appended claims, it is to be understood that the invention can be practiced otherwise than as specifically described.

What is claimed is:
1. A compound corresponding to the formula:

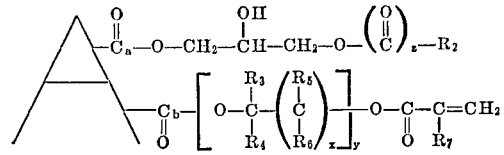

where A is the residual moiety of an organic dicarboxylic acid anhydride of the formula:

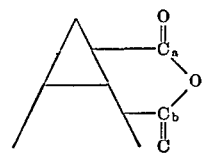

where

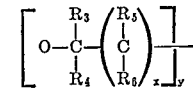

contains 2 to 10 carbon atoms, $x$ being a whole number from 1 through 9, $y$ being a whole number from 1 through 5, and $z$ being 0 or 1; where $R_2$ is a terminally-saturated hydrocarbon radical containing 1 to 30 carbon atoms; $R_3$, $R_4$, $R_5$ and $R_6$ are selected from the group consisting of hydrogen and lower alkyl; and where $R_7$ is selected from the group consisting of hydrogen and methyl.

2. A compound as in claim 1 wherein $R_7$ is hydrogen.
3. A compound as in claim 1 wherein $y$ is 1.
4. A compound as in claim 3 wherein $R_7$ is hydrogen.
5. A compound as in claim 4 wherein $R_3$, $R_4$, $R_5$ and $R_6$ are hydrogen.

6. A compound as in claim 1 wherein A is selected from the group consisting of

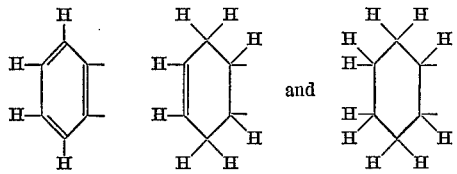

and

7. A compound as in claim 6 wherein $R_7$ is hydrogen.
8. A compound as in claim 6 wherein $y$ is 1.
9. A compound as in claim 8 wherein $R_7$ is hydrogen.
10. A compound as in claim 9 wherein $R_3$, $R_4$, $R_5$ and $R_6$ are hydrogen.
11. A compound as in claim 2 wherein $R_2$ contains 6 to 20 carbon atoms.
12. A compound as in claim 11 wherein $y$ is 1.
13. A compound as in claim 12 wherein $R_7$ is hydrogen.
14. A compound as in claim 13 wherein $R_3$, $R_4$, $R_5$ and $R_6$ are hydrogen.
15. A method of forming a coating which comprises applying to a substrate a composition comprising a compound corresponding to the formula:

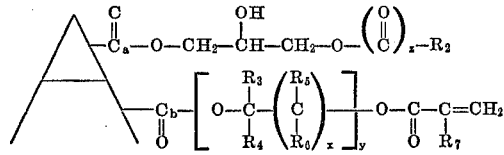

where A is the residual moiety of an organic dicarboxylic acid acid anhydride of the formula:

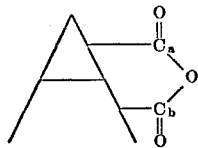

where

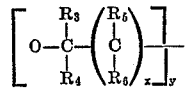

contains 2 to 10 carbon atoms, $x$ being a whole number from 1 through 9, $y$ being a whole number from 1 through 5, $z$ being 0 or 1; where $R_2$ is a terminally-saturated hydrocarbon radical containing 1 to 30 carbon atoms; $R_3$, $R_4$, $R_5$ and $R_6$ are selected from the group consisting of hydrogen and lower alkyl; and where $R_7$ is selected from the group consisting of hydrogen and methyl, and subjecting the coating thus formed to ionizing radiation.

16. A method as in claim 15 wherein $R_7$ is hydrogen.
17. A method as in claim 15 wherein $y$ is 1.
18. A method as in claim 17 wherein $R_3$, $R_4$, $R_5$ and $R_6$ are hydrogen.
19. A method as in claim 12 wherein $R_2$ contains 6 to 20 carbon atoms.
20. A method as in claim 19 wherein $R_7$ is hydrogen.
21. A method as in claim 19 wherein $y$ is 1.
22. A method as in claim 21 wherein $R_3$, $R_4$, $R_5$ and $R_6$ are hydrogen.
23. The coated article formed by the method of claim 5.
24. A compound as in claim 1 wherein $z$ is 0.
25. A compound as in claim 24 wherein $R_7$ is hydrogen.
26. A compound as in claim 24 wherein $y$ is 1.
27. A compound as in claim 26 wherein $R_7$ is hydrogen.
28. A compound as in claim 27 wherein $R_3$, $R_4$, $R_5$ and $R_6$ are hydrogen.
29. A method as in claim 15 wherein the composition contains at least one polyfunctionally unsaturated radiation-polymerizable film-forming monomer.

30. A method of preparing a compound corresponding to the formula:

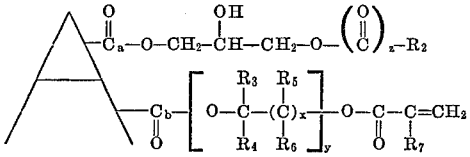

where A is the residual moiety of an organic dicarboxylic acid anhydride of the formula:

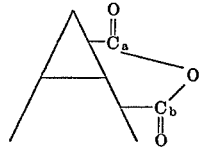

where

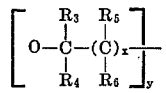

contains 2 to 10 carbon atoms, $x$ being a whole number from 1 through 9, $y$ being a whole number from 1 through 5, and $z$ being 0 or 1; where $R_2$ is a terminally-saturated hydrocarbon radical containing 1 to 30 carbon atoms; $R_3$, $R_4$, $R_5$ and $R_6$ are selected from the group consisting of hydrogen and lower alkyl; and where $R_7$ is selected from the group consisting of hydrogen and methyl; which comprises reacting an organic dicarboxylic anhydride of the formula:

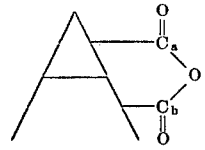

with a hydroxyalkyl acrylate of the formula:

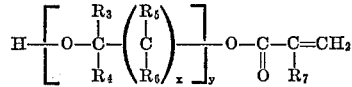

where $R_3$, $R_4$, $R_5$ and $R_6$ are selected from the group consisting of hydrogen and lower alkyl and $R_7$ is selected from the group consisting of hydrogen and methyl, preferably hydrogen, and where $x$ is a whole number from 1 through 9 and $y$ is a whole number from 1 through 5, the group

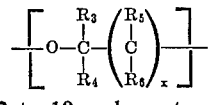

containing from 2 to 10 carbon atoms, to form a half-ester; subsequently reacting the resultant half-ester with a compound selected from the group consisting of glycidyl esters and ethers of acids or alcohols containing 1 to 30 carbon atoms.

References Cited
UNITED STATES PATENTS 3,485,733   12/1969   D'Alelio _____ 204—159.22 X
3,367,992   2/1968    Bearden _____ 260—475 UN ALFRED L. LEAVITT, Primary Examiner J. H. NEWSOME, Assistant Examiner U.S. Cl. X.R.

117— 161 K, 161 UC; 204—159.22; 260—89.5, 475 N, 475 P

UNITED STATES PATENT OFFICE
CERTIFICATE OF CORRECTION

Patent No. 3,690,927　　　　　　　　　Dated September 12, 1972

Inventor(s) Gordon M. Parker and Raymond C. Heuser

It is certified that error appears in the above-identified patent and that said Letters Patent are hereby corrected as shown below:

Column 10, under "References Cited", the following two U.S. Patents were omitted:

```
---2,384,119   9/1945   Muskat et al. --------260—89.5 X
   3,455,801   7/1969   D'Alelio ------------204—159.22X---
```

Signed and sealed this 6th day of February 1973.

(SEAL)
Attest:

EDWARD M. FLETCHER, JR.　　　　　　　　ROBERT GOTTSCHALK
Attesting Officer　　　　　　　　　　　　Commissioner of Patents